United States Patent
Frey, Jr.

(10) Patent No.: US 6,714,949 B1
(45) Date of Patent: Mar. 30, 2004

(54) DYNAMIC FILE SYSTEM CONFIGURATIONS

(75) Inventor: Alexander H. Frey, Jr., Wayzata, MN (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/558,318

(22) Filed: Apr. 25, 2000

(51) Int. Cl.[7] .............................. G06F 17/30; G06F 9/06
(52) U.S. Cl. ........................ 707/200; 707/1; 707/205; 713/1; 713/2
(58) Field of Search ............... 707/1, 7–10, 100–104.1, 707/200–201, 500, 526, 523–524; 711/1–6, 100–111, 167–173, 200–208; 713/1–2

(56) References Cited

U.S. PATENT DOCUMENTS

| | | | |
|---|---|---|---|
| 5,497,492 A | * | 3/1996 | Zbikowski et al. ............. 713/2 |
| 5,961,582 A | * | 10/1999 | Gaines ........................... 709/1 |
| 6,026,402 A | * | 2/2000 | Vossen et al. .................. 707/9 |
| 6,493,804 B1 | * | 12/2002 | Soltis et al. ................. 711/152 |

OTHER PUBLICATIONS

Maurice J. Bach, *The Design of the UNIX Operating System, Introduction to System Concepts*, Copyright 1990, pp. 22–24.
Maurice J. Bach, *The Design of the UNIX Operating System, Internal Representation of Files*, Copyright 1990, pp. 60–90.
Maurice J. Bach, *The Design of the UNIX Operating System, Mounting and Unmounting File Systems*, Copyright 1990, pp. 119–140.

* cited by examiner

*Primary Examiner*—Alford Kindred
(74) *Attorney, Agent, or Firm*—Martine & Penilla, LLP (57) ABSTRACT

A first file system configuration may be dynamically migrated (morphed) into a second file system configuration on an object-by-object basis. During the migration operation, objects (directories and files, data and metadata) may be accessed by client applications through, either the first or second file system configurations. That is, objects are transparently shared between co-active first and second file system configurations. Additionally, a file system morph operation already in progress may be canceled with all objects previously morphed to the second file system configuration returned to the first file system configuration.

38 Claims, 7 Drawing Sheets

DYNAMIC FILE SYSTEM CONFIGURATIONS

BACKGROUND

The invention relates generally to computer system storage and, more particularly but not by way of limitation, to techniques (methods and devices) that provide the ability to change a computer system's file system configuration from a first configuration to a second configuration wherein the two configurations share resources.

One function of a computer file system is to allocate and manage secondary memory for the storage and retrieval of data. Controlled by the operating system kernel, a typical file system includes a boot block (optional), a super block, an object list and data blocks.

The boot block occupies a well-known and previously specified area of disk storage (which may or may not be included in the area managed by the file system). It is typically the first sector of a disk, and may contain the bootstrap code that is read into the computer system's main memory and executed during system start up operations, often before the file system is initialized.

The super block is stored in an area of disk storage assigned to the file system and at a previously specified location relative to the start of the area managed by the file system. The super block describes the storage to be used by the file system, system-wide parameters of the file system and how to find the object list. In the file system, objects typically are files or directories.

The object list is a list of object names each paired with a pointer to that object's attributes (hereinafter referred to as the objects' inodes). The object list is stored in a disk location indicated (directly or indirectly) in the super block. Each inode contains the information necessary for a process to access a file or directory, such as file ownership, access rights, file size, and location of the file's data in the file system. One inode is the root inode of the file system. It is this inode through which the directory structure of the file system is accessible after the file system is mounted (i.e., made available or booted).

Data blocks contain the file and directory data and administrative data associated with the file system.

Some prior art file systems allow users (e.g., system administrators) to modify the configuration of an operational file system to include one or more additional storage units (or volumes). Still other prior art file systems allow users to move data stored on existing storage devices to a newly added storage unit. No known file system, however, permits a user to migrate an operational file system from a first configuration to a second configuration wherein the first and second configuration share resources. In addition, no known file system permits a first file system configuration to be automatically migrated to a second configuration, without loss of data or access to that data during the migration operation, wherein the second configuration comprises fewer storage control units than the first configuration. These and other aspects of current file systems are overcome by a file system in accordance with the invention.

SUMMARY

In one embodiment the invention provides a method to migrate objects from a first file system configuration to a second file system configuration. The method includes determining and specifying the second file system configuration, initializing the second file system configuration so that the first and second file system configurations are jointly active, identifying one or more objects in the first file system configuration to migrate to the second file system configuration and migrating (morphing) the one or more objects to the second file system configuration while allowing access to the objects through both the first and second file system configurations.

In another embodiment, the invention provides a method to share a resource between a first file system configuration and a second file system configuration. The method includes attempting to access the resource through the first file system configuration, determining the resource is associated with the second file system configuration and accessing the resource through the second file system configuration.

Objects and resources may comprise directory objects and file objects and may further include data and metadata. Further, methods in accordance with the invention may be stored in any media that is readable and executable by a programmable control device.

DETAILED DESCRIPTION

Techniques (including methods and devices) to migrate a file system from a first configuration to a second, co-active, configuration are described. The following embodiments of the invention are illustrative only and are not to be considered limiting in any respect.

Figure 1:
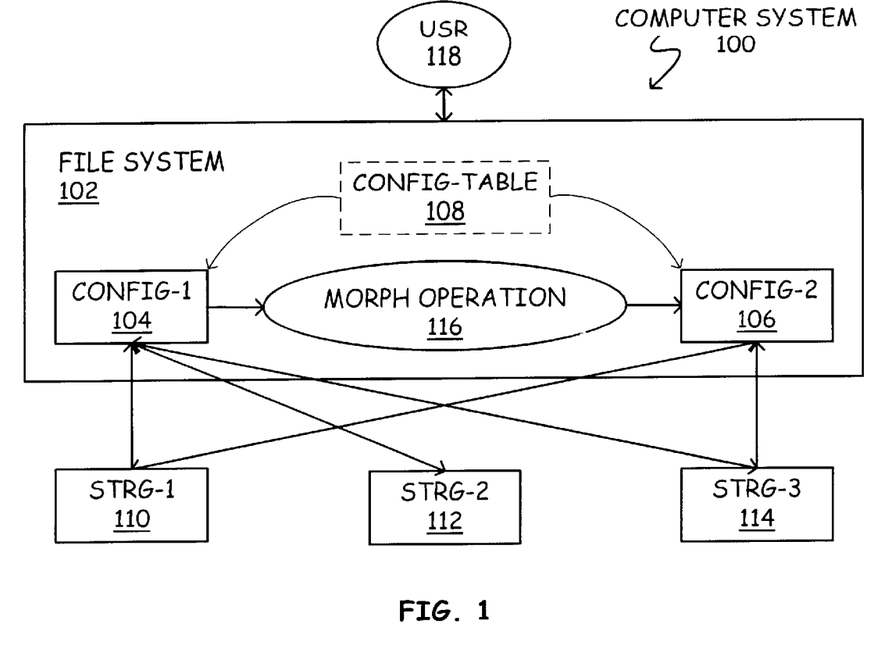
FIG. 1 shows an illustrative computer system in accordance with the invention having two simultaneously active file system configurations.

Referring to FIG. 1, one embodiment of a computer system 100 in accordance with the invention includes file system 102 having two (or more) simultaneously mounted file system configurations 104 and 106, the specifications for which may be stored in configuration table 108 (CONFIG-TABLE). As illustrated, configuration one (CONFIG-1 104) defines a file system in which data is distributed across three storage sub-systems (STRG-1 110, STRG-2 112 and STRG-3 114). Configuration two (CONFIG-2 106) defines a file system in which data is distributed across two storage sub-systems (STRG-1 110 and STRG-3 114). While configuration table 108 is shown as a single entity, it may be implemented as a plurality of tables/files. For example, there may be one configuration table for each configuration. While not shown, one of ordinary skill will recognize that each of storage sub-systems 110, 112 and 114 may include one or more controllers (processors) and one or more physical storage devices (e.g., magnetic disk storage devices). During the migration from CONFIG-1 104 to CONFIG-2 106 (controlled by file system morph operation 116), users (collectively indicated by USR 118) retain their ability to access any stored data regardless of which configuration is currently the controlling configuration for the data. Thus, file system 102 shares resources between CONFIG-1 104 and CONFIG-2 106 during the morph process.

Figure 2:
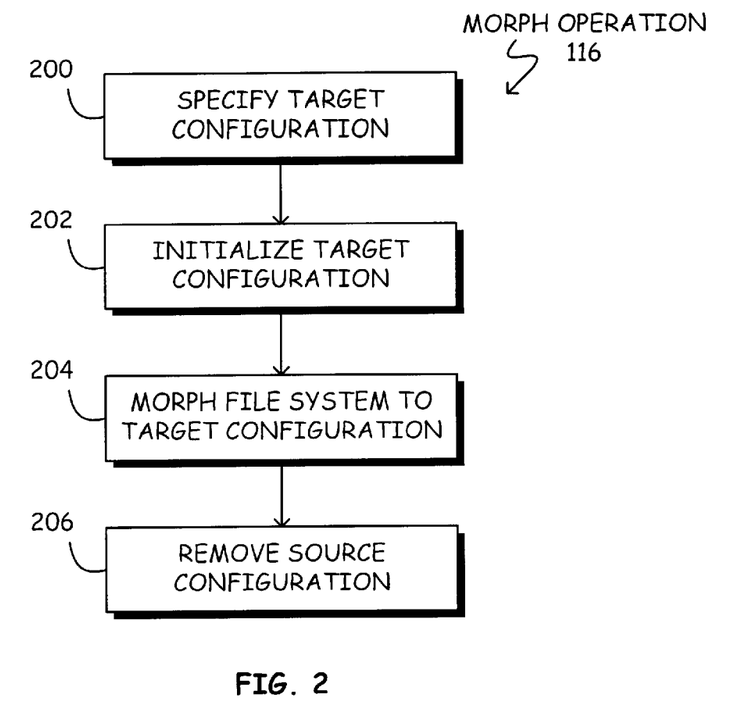
FIG. 2 shows a flow diagram illustrating a file system morph process in accordance with one embodiment of the invention.

Referring now to FIG. 2, a high-level flow diagram of morph operation 116 is shown. (Details of an illustrative implementation are described below.) Initially, a file system administrator defines a target file system configuration (block 200). In one embodiment, the target configuration may be input via a graphical user interface (GUI). In another embodiment, the target configuration may be input via a text file having a predefined structure (i.e., a configuration or config file). Once specified, the target configuration is initialized (block 202). Initialization includes, but is not limited to, identifying one or more controllers, initializing one or more memory management processes on each of the identified controllers and determining which physical storage devices, or parts thereof, each of the specified memory management processes are tasked with managing. Following initialization, morph operation 116 moves data on an object-by-object basis (e.g., file object and/or directory object) from the source configuration to the target configuration (block 204). Once all data has been moved, the source configuration is removed (block 206). For example, all executing storage processes associated with the source configuration may be terminated and all hardware control devices (controllers) allocated to the source configuration and not to the target configuration may be powered-down.

Figure 3:
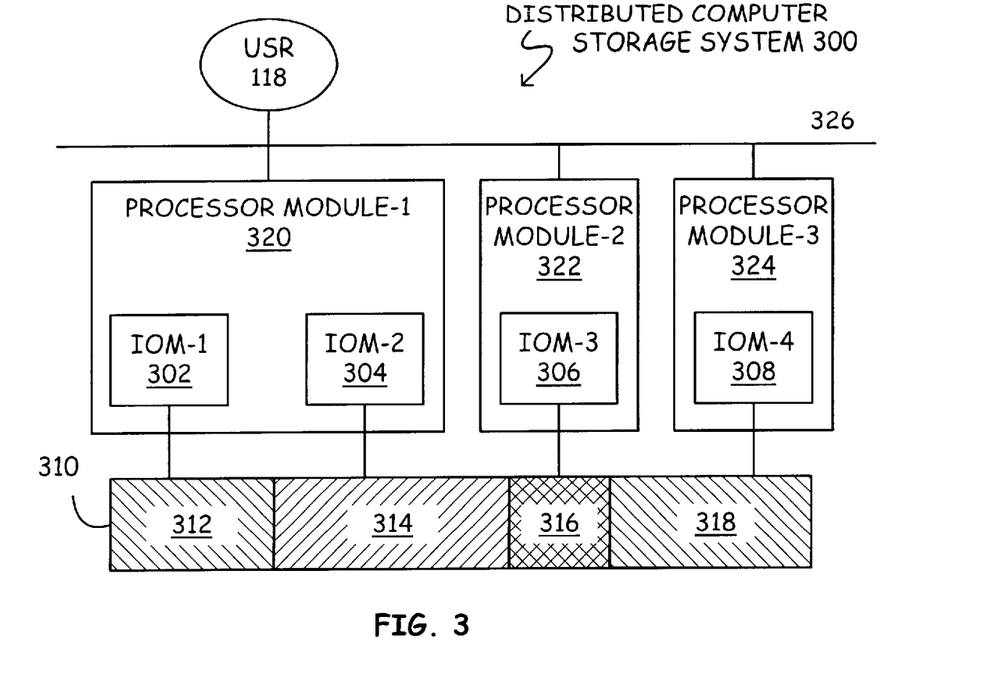
FIG. 3 illustrates a distributed computer storage system.

In one embodiment, morph operation 116 operates in a distributed storage environment such as that illustrated in FIG. 3. As shown, distributed computer storage system 300 includes input-output manager processes IOM-1 through IOM-4 (302, 304, 306 and 308 respectively), each of which manages the physical storage of a discrete portion of the system's available storage media 310; portion 312 is managed by IOM-1 302, portion 314 is managed by IOM-2 304, portion 316 is managed by IOM-3 306 and portion 318 is managed by IOM-4 308. (Each portion of storage media 310 may comprise part of a single physical storage device, an entire physical storage device, multiple physical storage devices, or parts of multiple physical storage devices.) Further, in the implementation shown, IOMs' 1 302 and 2 304 execute on processor module-1 320, IOM-3 306 executes on processor module-2 322 and IOM-4 executes on processor module-3 324, wherein each of processor modules 320, 322 and 324 has an instantiation of the file system's 102 kernel application. Users 118 access storage media 310 through communication network 326.

Figure 4:
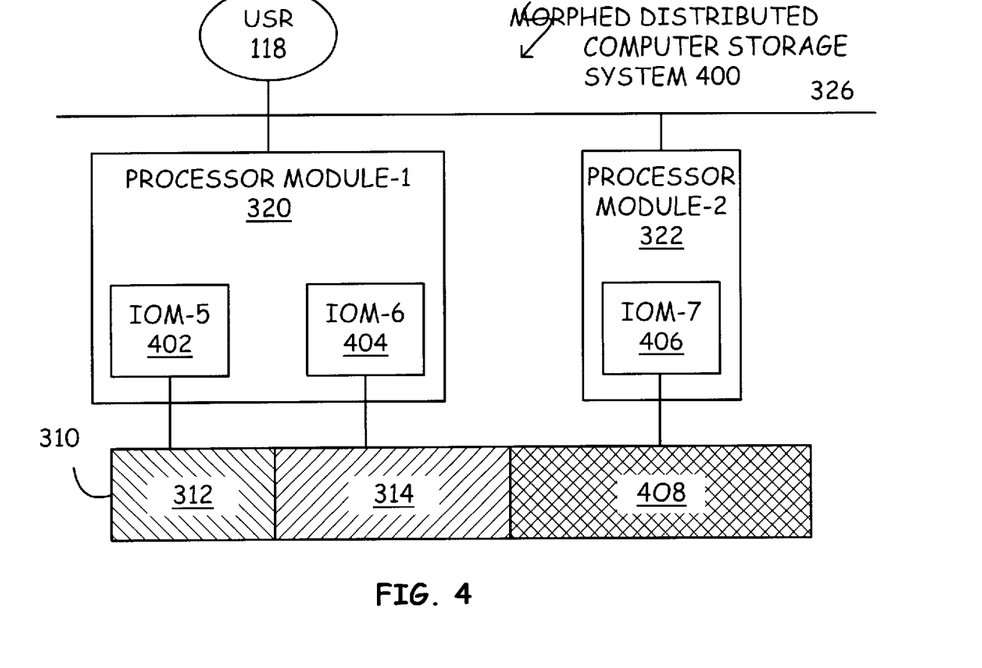
FIG. 4 shows the computer storage system of FIG. 3 after a morph operation in accordance with one embodiment of the invention.

By way of example, the configuration illustrated in FIG. 3 may be migrated into the configuration of FIG. 4 by morph operation 116. Modified distributed computer storage system 400 has two processor modules 320 and 322 (processor module-3 324 has been eliminated) and three IOM processes 402, 404 and 406 to manage system storage 310. As indicated, storage 310 been segregated into three management areas 312, 314 and 408, the latter of which combines storage media portions 316 and 318 of the source configuration (FIG. 2). Prior to initiating the file system morph, a system administrator defines the target configuration which, in the context of FIG. 3, specifies those processor modules which are in the configuration, one or more IOM processes associated with each processor module and that portion of system storage 310 which each specified IOM process is to manage (block 200). Each IOM (402, 404 and 406) in the target configuration (FIG. 4) is then initialized on its specified processor module (320 and 322) and the target file system configuration is initialized as an empty file system (block 202). Morph operation 116 then begins moving each data object (file and directory) in the source configuration of FIG. 3 to the target configuration of FIG. 4 (block 204). If a user 118 attempts to access an object during the migration, morph operation 116 will determine which configuration (i.e., which of IOM-1 through IOM-7) currently controls that object (or part thereof) and routes the request accordingly. On morph completion, those IOM processes associated with the source configuration (302, 304, 306 and 308) may be terminated and the source configuration table or that part of the configuration table defining the source configuration may be deleted (block 206). In the end, all data originally controlled by IOM 1 through 4 in the source configuration are now managed by IOMs 5 through 7 of the target configuration.

Figure 5:
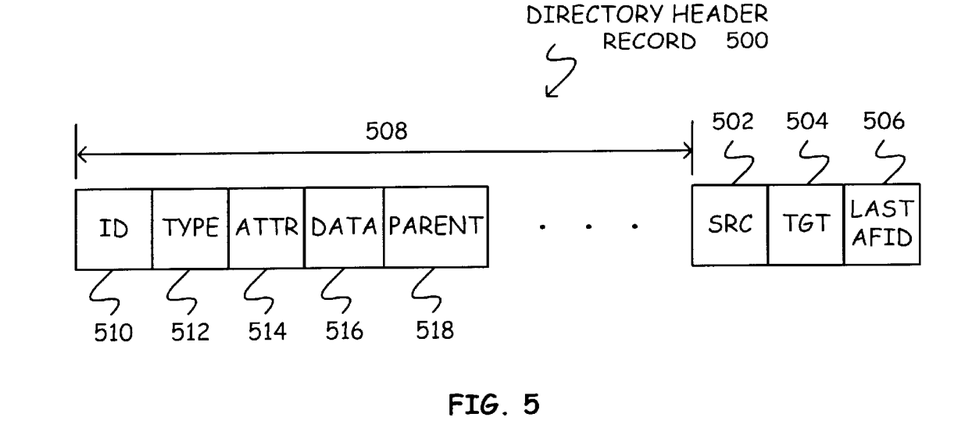
FIG. 5 shows a directory header record in accordance with one embodiment of the invention.

In the discussion that follows, the following nomenclature will be used: (1) a DFID is a handle to a directory object; (2) a GFID is a handle to a file object; (3) an AFID is a handle to a generic object, i.e., a file or directory; (4) SRC_DFID, SRC_GFID and SRC_AFID refer to source configuration objects; and (5) TGT_DFID, TGT_GFID and TGT_AFID refer to target configuration objects. In addition, and as shown in FIG. 5, each directory header record 500 of the file system in accordance with the invention includes source field 502, target field 504 and last AFID field 506. These fields guide and limit the recursive nature of morph operation 116 (see discussion below). If a directory is a target directory, its header record's source field 502 will identify its source directory in the source configuration. Similarly, if a directory is a source directory, its header record's target field 504 will identify its target directory in the target configuration. The last AFID field 506 identifies that object (file or directory) that was last morphed. If no morph is in progress, these fields may be set to NULL or simply ignored. As shown, source, target and last AFID fields (502, 504 and 506 respectively) are in addition to conventional directory fields 508. Illustrative conventional directory fields 508 include, but are not limited to: identification field 510; record type field 512 (e.g., top of directory, free and empty); record attributes 514 such as permissions and fault tolerant assignments; pointers to the directory's data entries 516; and identification of the directory's parent directory 518.

Figure 6:
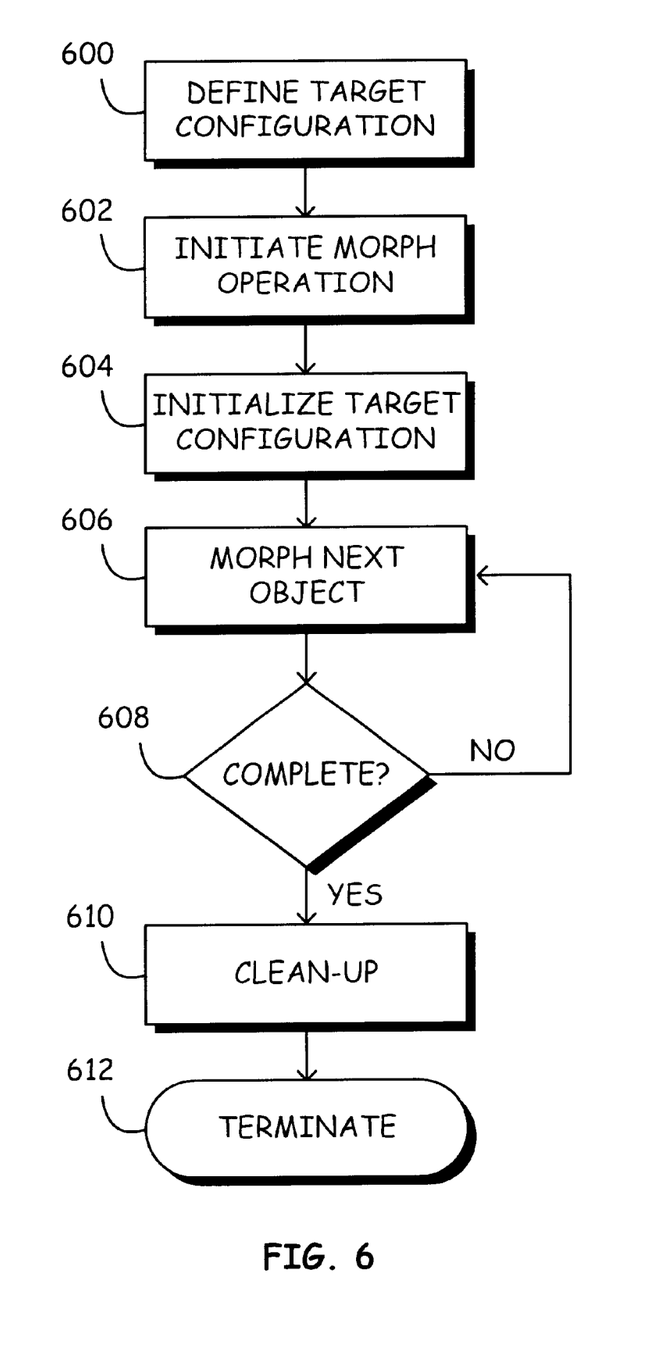
FIGS. 6 shows a flow diagram of a file system morph operation in accordance with one embodiment of the invention.

Referring now to FIG. 6, the first step to morphing a file system is to define a target configuration (block 600). In one embodiment, a file system configuration is defined by: (1) identifying one or more controllers (hereinafter nodes) that are to be a part of the configuration; (2) specifying one or more IOM processes to execute on each identified node; and (3) associating one or more physical storage media partitions with each of the specified IOM processes. Optionally, fault tolerance, ownership, access and other user or system level attributes may be assigned at configuration definition time. Typically, a system administrator will define a target configuration through a GUI or text file configuration routine executing on a node. Configuration data (both source and target) may be stored in one or more configuration tables (see FIG. 1) which together serve a similar purpose as a UNIX® super block structure. In one embodiment, each configuration is associated with a separate configuration table, and an IOM in one configuration "communicates"

with an IOM in a second configuration via the second IOM's configuration table. In another embodiment, all configurations are defined in a single configuration table. Regardless of which approach is taken, the configuration table defining the target (new) configuration may be propagated to all nodes in the system or, alternatively, to only those nodes affected by the change in configuration.

Following the acts of block 600, a morph file system process may be initiated on an arbitrary node (block 602). Using C-like programming syntax, the morph operation may be initiated with a command of the form:

morph_file_system(SRC_DFID, TGT_DFID), where SRC_DFID represents that directory in the source configuration where the morph operation is to begin and TGT_DFID represents that directory in the target configuration where the morph operation is to begin. For example, where an entire first file system is being morphed into a second file system, SRC_DFID and TGT_DFID represent the source and target file systems' root directories.

Once invoked, the file system morph operation initializes the target configuration (block 604). During initialization, those nodes identified as belonging to the target configuration and not currently in the source configuration are booted (i.e., a file system kernel process is initiated on each such node), target configuration IOM processes are instantiated on their specified nodes, the address of each IOM process is noted in the source and target configuration tables, SOURCE and TARGET variables associated with each configuration are set and the configuration tables are hardened (stored to permanent storage). In one embodiment, SOURCE and TARGET configuration variables are used to identify the state of a morph operation: while in progress, the TARGET variable in the source configuration and the SOURCE variable in the target configuration are both non-NULL; once the morph operation has completed but before post-morph cleanup operations are completed (see discussion below), the SOURCE variable in the target configuration is set to NULL; and on completion of post-morph cleanup operations, the TARGET variable in the source configuration is set to NULL.

Having initialized the target configuration, the file system morph process begins the file system morph by morphing a source configuration object into a target configuration object (block 606). The first morph operation is performed on that source directory identified by the SRC_DFID parameter to the morph_file_system process. Again, using C-like programming syntax, the morph directory process may be initiated with a command of the form:

morph_directory(SRC_DFID, TGT_DFID, TGT_PARENT_DFID), where TGT _PARENT_DFID represents the "parent" directory of the target directory (TGT_DFID) in the new configuration. To morph a directory, each entry in that directory, which represents either a file or another directory, must have its object morphed. Thus, if an entry is for a directory, it will be morphed by another application of the morph-directory process. If an entry is for a file, a morph file process may be initiated with a command of the form:

morph_file(SRC_GFID, FILE_NAME, TGT_PARENT_DFID), where SRC_GFID and FILE_NAME values are obtained from the directory entry to be morphed and the TGT_PARENT_DFID is the target field (TGT 504) of the directory being processed to generate the morph_file command.

When a morph_directory process issues another morph_directory command or a morph_file command, it terminates. A morph_directory process also terminates when it returns to the morph cleanup operation described below (610).

On recursive invocations, the morph_directory process may have its target and target parent directory arguments (TGT_DFID and TGT_PARENT_DFID, respectively) set to NULL or some other value to indicate the absence of such information in a child (i.e., an object lower down in the directory tree). Typically, a morph_directory process is initiated on that node where the IOM managing the memory associated with the source directory (SRC_DFID) is executing.

In one embodiment, invocation of the morph directory process in accordance with block 606 begins a recursive operation that proceeds in a depth-first manner through the source configuration (see discussion below regarding FIGS. 7A–7B). If the object last morphed is not the last object in the source configuration (the "no" prong of diamond 608), the morph operation continues by morphing the next object (block 606). (Morph operation status can be determined by inspecting the remaining entries in the SOURCE directory and the value of the SRC and PARENT fields associated with the source configuration.) If the object last morphed is the last object in the source configuration (the "yes" prong of diamond 608), the morph operation is complete and a cleanup operation is performed (block 610) before termination of the file system morph operation (block 612). During cleanup (block 610), the morph file system process causes the: (1) TARGET variable in the source configuration to be set to NULL (thereby indicating to all nodes involved in the morph operation that the morph operation is complete); (2) source configuration IOMs to terminate; and (3) copies of the source configuration tables to be deleted.

Figure 7A:
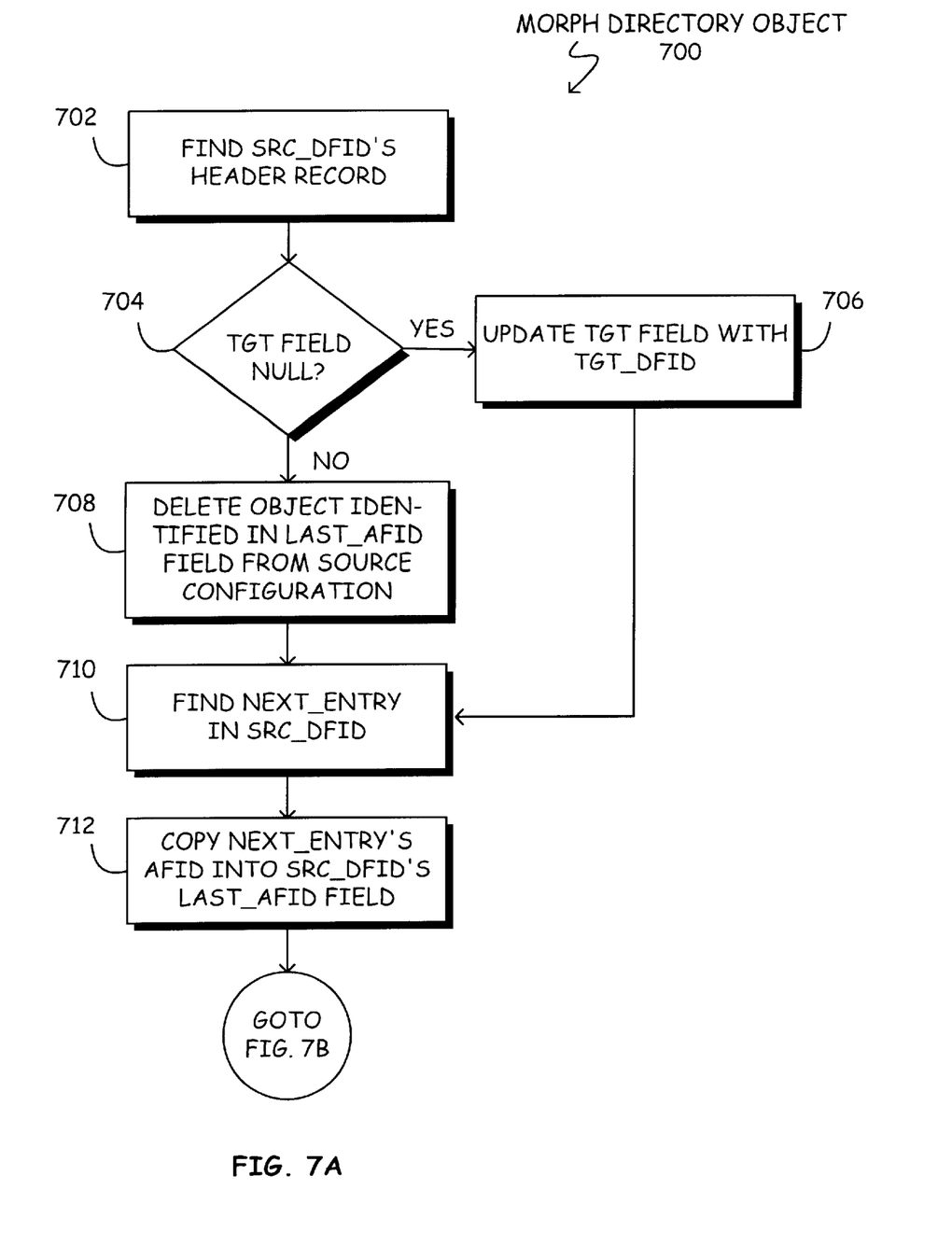
FIGS. 7A and 7B show a flow diagram of a morph directory process in accordance with FIG. 6.
Figure 7B:
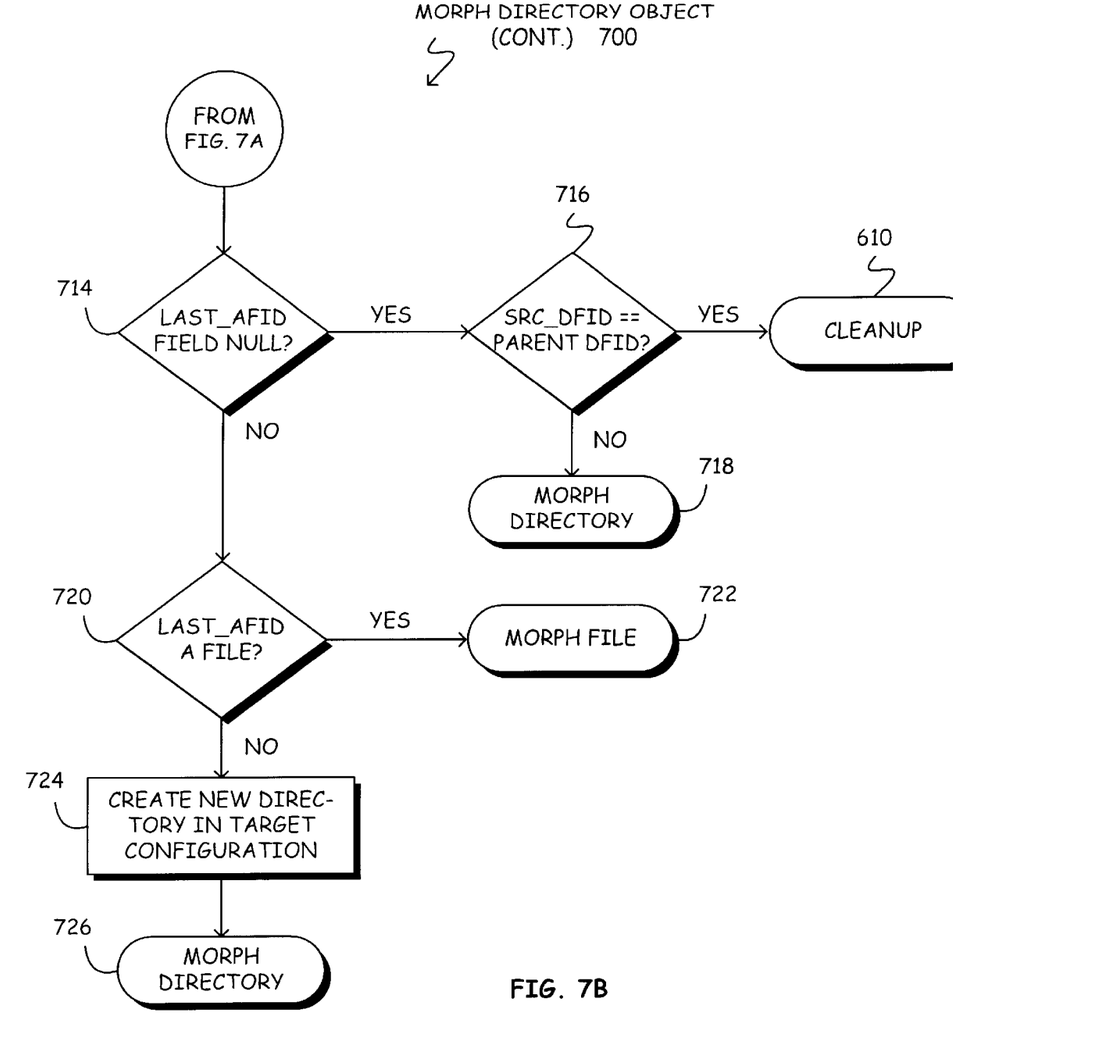

Referring to FIGS. 7A and 7B, a morph_directory process 700 in accordance with one embodiment of the invention begins by finding the directory record associated with the identified source directory or SRC_DFID (block 702). If the retrieved directory record's target field (TGT 504) is NULL (the "yes" prong of diamond 704), it is updated to identify the target directory or TGT_DFID from the morph_directory request 700 (block 706). (If the TGT field 504 is NULL, the particular directory identified by SRC_DFID has not yet started being processed/morphed.) The morph_directory request 700 then continues at block 708 described below.

If the retrieved directory record's target field (TGT 504) is non-NULL (the "no" prong of diamond 704), this invocation of the morph_directory process is a second or subsequent morph_directory request to the source DFID. In this case, the LAST_AFID field 506 of the of the SRC_DFID directory header 500 was updated by the previous morph_directory request to be the AFID to which it was sending the next morph request. The LAST_AFID field is therefore non-NULL and the morph of that AFID has been finished. Therefore, the object identified by the LAST_AFID entry may be deleted from the source file system as indicated in block 708. Following the acts of block 708, that entry following the now deleted LAST_AFID entry (hereinafter, NEXT_ENTRY) in source directory SRC_DFID is retrieved (block 710) and the NEXT_ENTRY'S AFID is copied into the LAST_AFID field 506 of the SRC_DFID directory header 500 (block 712). Following the acts of block 712, processing continues at diamond 714 in FIG. 7B.

If the LAST_AFID field in the SRC_DFID record (which now indicates the next object to be morphed from this directory) is NULL (the "yes" prong of diamond 714), the morph process for this directory is finished and the depth-first traversal of at least a portion of the source file system has been completed and is coming back up the recursive call chain. Subsequently, if the SRC_DFID of the current directory is the same as the SRC_DFID's PARENT directory—518 in the source DFID's header record 500 (the "yes" prong of diamond 716), the morph operation is complete and morph cleanup operations are initiated (610, see FIG. 6). If the SRC_DFID of the current directory is not equal to the SRC_DFID's PARENT directory (the "no" prong of diamond 716), the morph process is continued at the SRC_DFID's PARENT directory by sending the next morph_directory request to the SRC_DFID's PARENT directory, thereby continuing the morphing of that directory (block 718). Using C-like programming syntax, this invocation of the morph_directory process 700 may be initiated with a command of the form:

morph_directory(Parent DFID of SRC_DFID, NULL, NULL), where SRC_DFID's parent directory may be determined from inspection of its Parent field 518.

If the LAST_AFID field in the SRC_DFID record is not NULL (the "no" prong of diamond 714), the morph process has not completed its depth_first traversal. The non-NULL value of the LAST_AFID field indicates the next object in the source directory that needs to be morphed. If the LAST_AFID indicates a file object (the "yes" prong of diamond 720), the morph file process is called (block 722). Using C-like programming syntax, invocation of morph file process 722 may be initiated with a command of the form:

morph_file(SRC_GFID, FILE_NAME, TGT_PARENT_DFID), where the SRC_GFID and FILE_NAME are obtained from the LAST_AFID entry in the source directory and the TGT_PARENT_DFID corresponds to the target field (TGT 504) in the source directory header record. The morph_file process is described below and in FIG. 8.

If the object identified in the LAST_AFID field is a directory object (the "no" prong of diamond 720), a new directory with the same name as the LAST_AFID object is created in the target configuration (block 724). In particular, this new directory is created at that location indicated by the TGT field 504 in the source directory header record. Following the acts of block 724, a morph_directory process is invoked on the newly created target configuration's corresponding source directory (block 726). Using C-like programming syntax, this invocation of morph_directory process 700 may be initiated with a command of the form:

morph_directory (SRC_DFID, TGT_DFID, TGT_PARENT_DFID), where the DFID of LAST_AFID is SRC_DFID, the DFID of the newly created directory is the TGT_DFID and TGT_PARENT_DFID corresponds to the TGT field 504 in the source directory header record.

Figure 8:
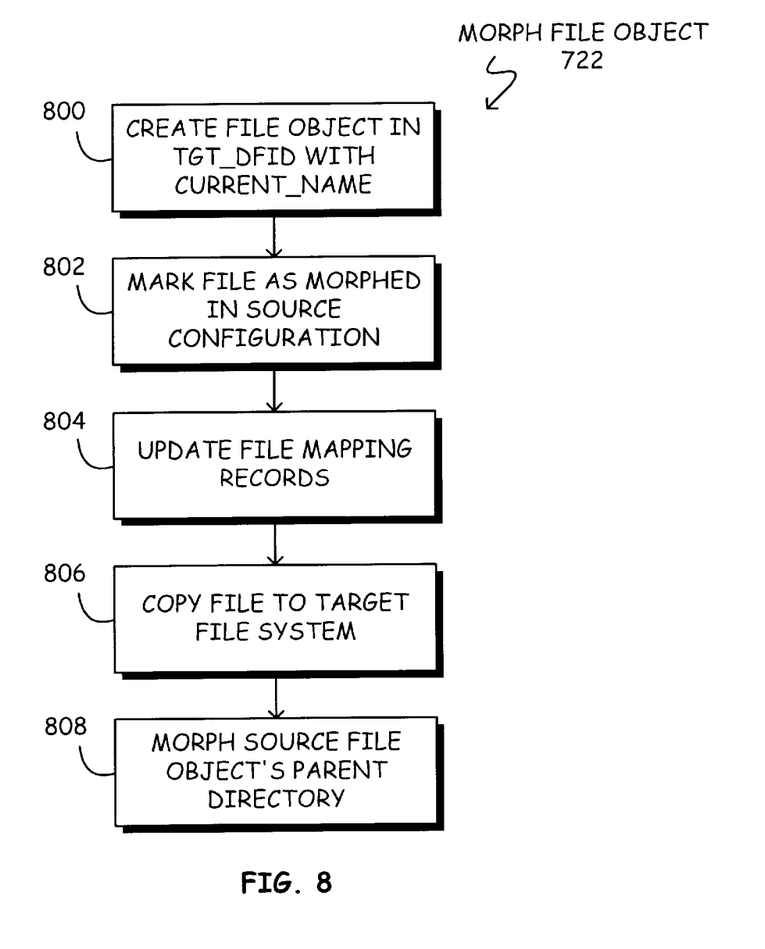
FIG. 8 shows a flow diagram of a morph file process in accordance with FIG. 7B.

Referring now to FIG. 8, a file morph operation in accordance with the invention begins by creating an empty object in the target file system having the same name (CURRENT_NAME) of the object being morphed from the source file system (block 800). The file object in the source directory (CURRENT_AFID) is then marked as morphed (block 802) and source and directory file system file mapping information is updated to reflect the "target" file identifier of the file being morphed (block 804). Next, the actual source file object is moved over to the target file system (block 806). Once the file object has been moved to the target file system (configuration), and before terminating, the morph_file process invokes morph_directory process 700 on the source file object's parent directory (block 708).

In one embodiment, the file move operation of block 806 is performed in a block-wise manner between a first IOM process that manages the memory associated with the source file (or that portion of the source file being moved) in the source file system and a second IOM process that is to manage the memory associated with the source file (or that portion of the source file being moved) in the target file system. The first (source) and second (target) IOM processes may operate in synchrony or via message passing. During data move operations, the source IOM process may delete the source file's data from the source IOM (and physical media) once it has been transmitted to the target IOM process. The target IOM process may have received a part of the source file from a client if the client performed a file write operation between the acts of blocks 802 and 806. Because of this possibility, before the target IOM process stores a block of incoming file data, it checks to determine if the data block (or a portion of it) already exists. If the data block (or a portion thereof) exists, the incoming data (or that portion already received) from the source IOM may be discarded. For two IOMs to share a partition in a physical storage media, it has been found beneficial to maintain a configuration-independent use-mapping of the partition. In one embodiment, a bitmap that indicates all the blocks in a partition that are currently being used by any partition is maintained by both of the configurations. In this approach, the partition's use bitmap may be associated with a physical storage partition rather than with any specific configuration. When the target configuration receives a block from the source configuration, the target configuration takes free memory from the use bitmap, and marks it as used, storing the data block in that space. After the source configuration transfers a block to the target configuration it marks the space that it had been using to store that block as free in the use bitmap.

One aspect of a file system morph operation in accordance with the invention is that users retain the ability to access all data during the morph. That is, directory and file operations initiated during a morph operation determine what configuration (source or target) the data is currently a part of and operate on that data. This ability to share data and data management infrastructure (e.g., memory controllers and IOM processes) resources between source and target configurations is a unique and beneficial aspect of the invention.

Illustrative methods for providing user access to data during a morph operation include the following:

1. Directory look-up. When a look-up of a long name is needed in a target directory having a non-NULL source field, the look-up operation is first performed in the source directory. If the name is not found in a source directory, the search continues in the source directory's target directory. If the name is found at any point, the metadata pointer associated with that name is returned to the look-up caller. If the name is not found in either the source directory or the target directory, a "name_not_found" response should be generated.

2. Create-file and make-directory operations. The new file or directory always is created in a specified parent directory in which the entry with new objects name and metadata pointer is placed. The new file or directory is created in the new target configuration if the parent directory has a non-NULL target field (i.e., it has been or is in process of being morphed). (Both create-file and make-directory operations may, as in conventional file systems, generate an error if a matching name is found.) More specifically, the morph directory processes set source field 502 (see FIG. 5) in the target directory's header record to the source DFID value. The morph file process sets a similar source field in the target file metadata. Similarly, the target file handle (GFID) or directory handle (DFID) is placed in the target field 504 of the source file's metadata (for a create-file operation) or the source DFID's header record (for a make-directory operation). Non-NULL source and target field values may be used during the morph process (file or directory) to guide file and directory access operations to operate in the source or target directories. If a parent directory DFID for a file-create or make-directory operation is in the source configuration and the header of the directory record into which its names are to be linked has a NULL target field, the file or directory may be created in the source configuration. (Any new name that is linked into the source configuration must be identified and morphed by an on-going morph operation.) If the header of the directory record into which names are to be linked has a non-NULL target field, the object should be created in the target configuration with that non-NULL target DFID as the target parent directory.

3. Link operations. Because link operations do not create new objects (files or directories), but only insert new names, they may use the file-create and make-directory rules for inserting new names. If the header of the directory record into which a name is to be linked has a non-NULL target field, the object should be linked into target directory. File-unlink and remove-directory functions operate in their usual manner.

4. Rename operations. File and directory rename operations are, essentially, a combination of the above operations in that a rename function: (1) performs a link function; (2) performs an unlink function on the object's old name.

5. Directory read operators. If the source field in the directory's header record is NULL, the read operation begins where it is. If the source field in the directory header is non-NULL, the read operation starts by going to the source directory. All entries in the source directory that have not already been morphed are read and, if the read object's target DFID is non-NULL, the read-directory operation proceeds to the target DFID and reads all entries that it finds there. The read-directory function is complete when all entries have been read if the read object's target DFID is NULL.

6. File operations, generally. All file operations that change a file's data or metadata should determine if the file's IOM (i.e., that IOM managing the file or portion thereof) has a non-NULL target IOM. If there is-a non-NULL target IOM, the operation should be forwarded to the owner of the target GFID (i.e., the file's IOM in the target configuration). All file operations will be executed at the owner of the target GFID.

7. File write operations. Can be executed entirely to the file's target GFID if the data being written covers one or more entire blocks. That is, if the data and metadata boundaries coincide with allocation unit boundaries of the relevant physical storage media. For that portion of a file write operation that does not meet this criteria, those blocks the remainder of the data and metadata are to be written are read from the target configuration if it has already been written there, or from the source configuration if that data has not yet been written to the target. Each file's metadata is updated to indicate whether or not the data needs to be read from the source configuration and written to the target configuration prior to completing the write operation.

8. File read operations. Can be performed from the target GFID if there is one. That is, if the file-read request is originally received at the owner of a GFID in the source configuration and the IOM for that GFID has a target IOM in the target configuration, the file-read request is forwarded to the owner of the target GFID in the target configuration. If the file to be read does not yet have a target GFID (i.e., it has not yet started to be morphed into the target configuration), the read operation may be performed by the source configuration in a standard manner.

Figure 9:
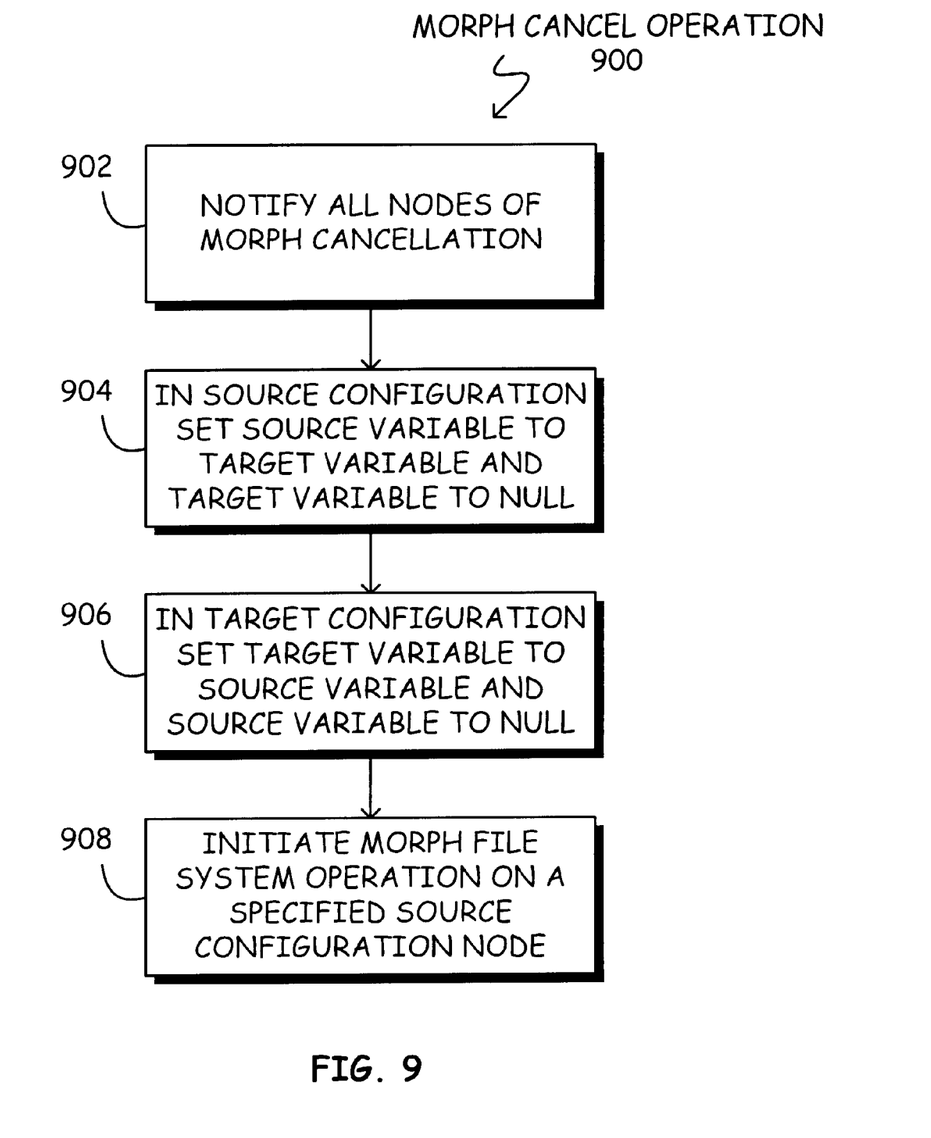
FIG. 9 shows a flow diagram of a cancel morph operation in accordance with one embodiment of the invention.

Another aspect of a file system morph operation in accordance with the invention is that the operation may be gracefully terminated or cancelled so that the original (source) file system is returned to its original state. Referring to FIG. 9, morph cancel operation 900 begins by notifying each node (e.g., memory control unit) that the current morph is no longer in progress (block 902). In one embodiment, this may be done by setting a "morph_in_progress" variable to NULL. (If this approach is taken, the morph_in_progress variable must be set to a non-NULL variable during the acts of block 602 in FIG. 6.) SOURCE and TARGET variables in the source and target configurations are then set as indicated in blocks 904 and 906 respectively and a new morph file system operation is initiated (block 908). On termination of this new morph file system operation, the original source configuration has been restored and the target configuration eliminated. In effect, morph cancel operation 900 stops an on-going morph operation (block 902), labels the source configuration as the target configuration (block 904), the target configuration as the source configuration (block 906) and initiates a new morph file system operation that, because of the acts of blocks 904 and 906, restores the state of the original source configuration.

One benefit of the invention is that a file system may be migrated from a first configuration to a second configuration in a manner that is transparent to users and applications. That is, a morph operation in accordance with the invention provides continued and uninterrupted access to all data even while the morph operation is in progress. Another benefit of the invention is that a file system may be migrated from a first configuration to a second configuration without the need to reboot the computer system or any node/processor comprising the computer system. Yet another benefit of the invention is that it allows one or more controllers to be taken out of use without the temporary loss of data availability. Still another benefit of the invention is that an on-going morph operation may be gracefully terminated and the file system restored to its original (source) configuration without loss of availability to data.

Another benefit of the invention is that it is not limited to root-to-root migrations. That is, a file system morph operation in accordance with the invention may migrate only a portion of a source configuration (e.g., those data stored on a specified hardware platform) to a target configuration (e.g., new or existing storage hardware). In addition, a file system morph operation in accordance with the invention may be beneficial in distributed as well as non-distributed computer storage systems. For example, in a distributed storage system such as that described in commonly owned U.S. patent application Ser. No. 09/261,708, entitled "Computer System Storage," memory translator processes are interposed (logically) between IOM processes and users. In this type of architecture, the memory translator processes are informed of any changes made to the memory managed by IOMs that are associated with the memory translator (e.g., when directories and files are created and destroyed).

Various changes in the details of the illustrated operational methods are possible without departing from the scope of the claims. For instance, the illustrative systems of FIGS. 3 and 4 may include more or fewer nodes, more or fewer memory control devices, and may additionally incorporate memory translators in accordance with U.S. patent application Ser. No. 09/261,708. In addition, acts in accordance with FIGS. 5–9 may be performed by a programmable control device executing instructions organized into a program module. A programmable control device may be a single computer processor, a plurality of computer processors coupled by a communications link, or a custom designed state machine. Custom designed state machines may be embodied in a hardware device such as a printed circuit board comprising discrete logic, integrated circuits, or specially designed application specific integrated circuits (ASICs). Storage devices suitable for tangibly embodying program instructions include all forms of non_volatile memory including, but not limited to: semiconductor memory devices such as EPROM, EEPROM, and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method to share a resource between a first file system configuration and a second file system configuration, comprising:

attempting to access the resource through the first file system configuration, the first file system configuration operating simultaneously with the second file system configuration, the first file system configuration consisting of a first set of storage resources, the second file system configuration consisting of subset of the first set of storage resources;

determining the resource is associated with the second file system configuration; and accessing the resource through the second file system configuration.

2. The method of claim 1, wherein the act of attempting comprises attempting to access a directory object.

3. The method of claim 1, wherein the act of attempting comprises attempting to access a file object.

4. The method of claim 1, wherein the act of attempting to access a resource comprises attempting to access a portion of the resource managed by a specified memory management process.

5. The method of claim 4, wherein the act of attempting further comprises selecting the specified memory management process from a plurality of memory management process, wherein each of the plurality of memory management processes manage a different portion of the resource.

6. The method of claim 5, further comprising selecting the specified memory management process from the plurality of memory management process, wherein each of the plurality of memory management processes execute on a different processor.

7. The method of claim 1, wherein the act of attempting comprises:

identifying a first memory management process in the first file system configuration associated with the resource; and requesting the resource from the first memory management process.

8. The method of claim 7, wherein the act of determining comprises:

receiving from the first memory management process an indication that the resource has been migrated to the second file system configuration; and receiving from the first memory management process an indication identifying a second memory management process in the second file system configuration, the second memory management process associated with the resource.

9. The method of claim 8, wherein the act of accessing comprises:

requesting the resource from the second memory management process; and receiving, in response to the request, the resource from the second memory management process.

10. The method of claim 9, wherein the act of receiving comprises receiving data associated with the resource.

11. The method of claim 9, wherein the act of receiving comprises receiving metadata associated with the resource.

12. A program storage device, readable by a programmable control device, comprising:

instructions stored on the program storage device for causing the programmable control device to attempt to access a resource through a first file system configuration, the first file system configuration in operation simultaneously with a second file system configuration, the first file system configuration consisting of a first set of storage resources, the second file system configuration consisting of subset of the first set of storage resources;

determine the resource is associated with the second file system configuration; and access the resource through the second file system configuration.

13. The program storage device of claim 12, wherein the instructions to attempt comprise instructions to access a portion of the resource managed by a specified memory management process.

14. The program storage device of claim 13, wherein the instructions to attempt further comprise instructions to select the specified memory management process from a plurality of memory management process, wherein each of the plurality of memory management processes manage a different portion of the resource.

15. The program storage device of claim 12, wherein the instructions to attempt comprise instructions to:

identify a first memory management process in the first file system configuration associated with the resource; and request the resource from the first memory management process.

16. The program storage device of claim 15, wherein the instructions to determine comprise instructions to:

receive from the first memory management process an indication that the resource has been migrated to the second file system configuration; and receive from the first memory management process an indication identifying a second memory management process in the second file system configuration, the second memory management process associated with the resource.

17. The program storage device of claim 16, wherein the instructions to access comprise instructions to:

request the resource from the second memory management process; and receive, in response to the request, the resource from the second memory management process.

18. A method to migrate objects from a first file system configuration to a second file system configuration, comprising:
specifying the second file system configuration;
initializing the second file system configuration, the first and second file system configurations operating simultaneously, the first file system configuration consisting of a first set of storage resources, the second file system configuration consisting of subset of the first set of storage resources;
identifying one or more objects in the first file system configuration to migrate to the second file system configuration; and
migrating the one or more objects to the second file system configuration while allowing access to the objects through both the first and second file system configurations.

19. The method of claim 18, further comprising halting each memory management process associated with the first file system configuration.

20. The method of claim 19, further comprising deleting indication of the first file system configuration.

21. The method of claim 18, wherein the act of specifying comprises:
associating one or more memory management processes with the second file system configuration, wherein each of the one or more memory management processes are distinct from any memory management process associated with the first file system configuration;
assigning each of the one or more memory management processes a distinct set of stored objects; and
associating each of the one or more memory management processes with a memory control device.

22. The method of claim 21, further comprising propagating the associations and assignments to each memory control device associated with the second file system configuration.

23. The method of claim 22, further comprising propagating the associations and assignments to each of one or more memory control devices associated with the first file system configuration.

24. The method of claim 21, wherein the act of initializing comprises:
booting each of the memory control devices associated with the second file system configuration that is not also associated with the first file system configuration; and
instantiating each of the one or more memory management processes associated with the second file system configuration on their associated memory control device.

25. The method of claim 18, wherein the ct of identifying comprises identifying a file object.

26. The method of claim 18, wherein the act of identifying comprises identifying a directory object.

27. The method of claim 26, wherein objects within the identified directory object are migrated to the second file system configuration in a depth-first manner.

28. The method of claim 18, further comprising:
canceling the migration of the one or more objects after a first portion of a first object of the one or more objects has been migrated to the second file system configuration and before a last portion of a last object of the one or more objects has been migrated to the second file system configuration; and
restoring those portions of the one or more objects migrated to the second file system configuration to the first file system configuration.

29. The method of claim 28, further comprising deleting indication of the second file system configuration.

30. The method of claim 18, wherein the act of migrating comprises:
interrogating a storage use map, wherein the storage use map indicates a first portion of storage allocated to the first file system configuration, a second portion of storage allocated to the second file system configuration, and a third portion of storage not yet allocated to the first or second file system configurations;
allocating, to the second file system configuration, sufficient storage from the third portion of storage to store the one or more objects; and
copying the one or more objects, from the first portion of storage, into the allocated storage.

31. The method of claim 30, further comprising allocating that storage associated with the one or more objects in the first file system configuration to the third portion of storage.

32. A program storage device, readable by a programmable control device, comprising:
instructions stored on the program storage device for causing the programmable control device to
specify a second file system configuration;
initialize the second file system configuration, the second file system configuration operating simultaneously with a first file system configuration, the first file system configuration consisting of a first set of storage resources, the second file system configuration consisting of subset of the first set of storage resources;
identify one or more objects in the first file system configuration to migrate to the second file system configuration; and
migrate the one or more objects to the second file system configuration while allowing access to the objects through both the first and second file system configurations.

33. The program storage device of claim 32, further comprising instructions to halt each memory management process associated with the first file system configuration.

34. The program storage device of claim 32, further comprising instructions to halt each of one or more memory management processes associated with the first file system configuration.

35. The program storage device of claim 32, further comprising instructions to:
cancel the migration of the one or more objects after a first portion of a first object of the one or more objects has been migrated to the second file system configuration and before a last portion of a last object of the one or more objects has been migrated to the second file system configuration; and
restore those portions of the one or more objects migrated to the second file system configuration to the first file system configuration.

36. The program storage device of claim 35, further comprising instructions to delete indication of the second file system configuration.

37. The program storage device of claim 32, wherein the instructions to migrate comprise instructions to:
interrogate a storage use map, wherein the storage use map indicates a first portion of storage allocated to the first file system configuration, a second portion of storage allocated to the second file system configuration, and a third portion of storage not yet allocated to the first or second file system configurations;

allocate, to the second file system configuration, sufficient storage from the third portion of storage to store the one or more objects; and copy the one or more objects, from the first portion of storage, to the allocated storage.

38. The program storage device of claim 37, further comprising instructions to allocate that storage associated with the one or more objects in the first file system configuration to the third portion of storage.

* * * * *